Patented Dec. 13, 1949

2,490,912

UNITED STATES PATENT OFFICE 2,490,912

PROCESS FOR PURIFYING ANTIFIBRINOLYSIN

Eugene C. Loomis, Grosse Pointe Park, Albert Ryder, Detroit, and Charles George, Jr., Ferndale, Mich., assignors to Parke, Davis & Company, Detroit, Mich., a corporation of Michigan No Drawing. Application May 24, 1947, Serial No. 750,364

6 Claims. (Cl. 260—112)

The invention relates to blood products and to methods for obtaining the same. More particularly, the invention relates to antifibrinolysin products.

This application is a continuation-in-part of our copending application Serial No. 731,864, filed March 1, 1947.

Antifibrinolysin is the name given to an activity present in blood plasma or serum which blocks the action of fibrinolysin on fibrin or fibrinogen. However, there are numerous objections of a practical nature to the use of plasma or serum for bringing about such action. For example, in skin grafting or like procedures where it is desired to obtain and maintain a firm fibrin clot, the use of plasma or serum would involve the use of large volumes of the same. Furthermore, the presence of certain impurities or concomitant foreign protein-like materials would cause undesirable reactions in the human subject, especially when using a plasma or serum from animal blood. Hence, a concentrated and purified material is highly desirable and is provided for the first time by our invention. Our products do not inactivate prothrombin and thrombin and are useful in skin grafting procedures where open lesions are present since it does not interfere with the patient's own blood clotting mechanism. They are especially useful where infectious organisms are present which tend to hasten the lysis of fibrin clots or where the patient possesses a sensitivity to the albumin-like proteins associated with less concentrated materials.

In accordance with our invention, antifibrinolysin products containing only a very small percentage of albumin-like protein associated with the antifibrinolysin are obtained from intermediate antifibrinolysin products containing between about 1 and 2 units of antifibrinolysin per milligram. Our process comprises acidifying to a pH between about 2.5 and 4 a solution containing an antifibrinolysin product having a purity of about 1 to 2 units of antifibrinolysin per milligram and sufficient ammonium sulfate to at least half saturate the solution, removing the albumin-like protein which separates from the solution, neutralizing the solution, dialyzing the neutralized solution through a semi-permeable membrane until it is substantially free from all inorganic salts and dialyzable organic material, and then freezing the dialysand and subliming the ice therefrom under greatly reduced pressure.

The ammonium sulfate solutions of the partially purified antifibrinolysin which we use in the present process may be prepared by dissolving a dry, partially purified antifibrinolysin product, such as those produced in accordance with the process disclosed in our copending application, Serial No. 731,864, filed March 1, 1947, in an ammonium sulfate solution or by dissolving such products in water and adding sufficient ammonium sulfate to the solution to bring the concentration to the desired value.

Alternatively, these solutions may be prepared from either blood plasma or serum without the isolation of the partially purified antifibrinolysin product in the dry form. In this case the preliminary purification process in conjunction with the above described purification procedure comprises a unit process for obtaining a highly purified antifibrinolysin product directly from plasma or serum. This embodiment of the invention in its simplest form comprises adding sufficient ammonium sulfate to human, bovine or equine blood plasma or serum at about −5 to +5° C. to bring the ammonium sulfate concentration to at least 50% of saturation, removing the precipitated material, acidifying the ammonium sulfate solution of the partially purified antifibrinolysin product to a pH of about 2.5 to 4, removing the albumin-like protein which precipitates from the solution, neutralizing and dialyzing the solution through a semi-permeable membrane until it is substantially free from all inorganic salts and dialyzable organic material, and then freezing the dialysand and subliming the ice therefrom under greatly reduced pressure.

We have found that either inorganic or organic acids can be used to acidify the ammonium sulfate solution of the partially purified antifibrinolysin product. Some examples of the acids which are suitable for this purpose are hydrochloric, hydrobromic, sulfuric and acetic acids. In dialyzing the clear neutralized solution obtained after precipitation of the albumin-like protein, any suitable semi-permeable membrane may be used. Such membranes may be of the cellulosic type of which cellophane is an example or they may be animal membranes such as those obtained from hog or beef intestines.

The antifibrinolysin products of the present invention are light, fluffy solids varying in color from white to a light pinkish or cream color. They are quite stable and may be heated in the dry state for as long as 40 days at 50° C. without loss of their activity. At room temperature they are stable for at least two years in the solid form and for several months in solution. They are proteinoid in nature and possess properties similar to the albumins. In solution these products are non-dialyzable, inactivated by relatively high temperatures and inactivated by organic solvents such as chloroform and acetone. The dry products are soluble in water and saline but are not precipitated from such solutions by salts such as sodium chloride, sodium sulfate or ammonium sulfate. These products do not inactivate prothrombin or thrombin but inactivate fibrinolysin. The fibrinolysin inactivation or inhibition of this enzyme is utilized to determine the purity of these products; one unit of antifibrinolysin being defined as the amount of antifibrinolysin required to inhibit one unit of fibrinolysin (the amount of fibrinolysin which will dissolve one cubic centimeter of a 0.3% fibrin clot in two minutes). When tested by this method the products of the present invention are found to possess an antifibrinolysin activity of about 7.5 to 9.5 units per milligram which indicates that they contain from about 70 to 85% pure antifibrinolysin. For therapeutic use these highly purified, dry antifibrinolysin preparations may be standardized and dispensed in sealed ampoules or other similar containers in a predetermined unitage or dose.

The invention is illustrated by the following examples:

Example 1

666 cc. of saturated ammonium sulfate solution is added to one liter of fresh bovine plasma at 0 to 5° C. Solid ammonium sulfate is added to the cold plasma until the concentration of the ammonium sulfate reaches 65% of saturation. The precipitate which has separated from the plasma is removed by centrifugation and discarded. The supernatant solution is dialyzed against cold water through a semi-permeable membrane until it is substantially free from all inorganic salts and dialyzable organic material. The dialysand is placed in a bottle, frozen in the customary shell form and the ice sublimed from the frozen material under greatly reduced pressure such as less than 0.5 mm. mercury to obtain the desired partially purified antifibrinolysin product as a light, fluffy, cream colored solid. The yield of this material is about 10 g. assaying about 1.5 to 2 units of antifibrinolysin per milligram.

10 g. of the dry, partially purified antifibrinolysin product obtained as described above is dissolved in 325 cc. of distilled water and an equal volume of saturated ammonium sulfate solution added. The resulting solution is acidified to a pH of about 3.8 with a mineral acid such as dilute sulfuric acid and the albumin-like protein which separates from the solution removed by centrifugation. The clear supernatant solution is adjusted to about pH 7.2 with dilute sodium hydroxide solution and the neutralized solution dialyzed against cold water through a cellulosic semi-permeable membrane until it is substantially free from all inorganic salts and dialyzable organic material. The dialysand is placed in a bottle or flask, frozen in the customary shell form and the ice sublimed from the frozen material under a pressure of less than about 0.5 mm. of mercury.

The residue which consists of the desired antifibrinolysin product is a light, fluffy, cream or pinkish colored solid. The yield of this material is about 0.1 to 0.15 g. assaying at about 9 units of antifibrinolysin per milligram or about 75 to 85% pure antifibrinolysin. This product is stable for at least two years in the dry state and in solution about a week at room temperature. Even at 50° C. this product retains its potency for a period of at least 40 days.

Example 2

An equal volume of saturated ammonium sulfate solution is added to one liter of fresh bovine plasma at 0 to 5° C. and the precipitate which separates from the solution removed by centrifugation and discarded. The clear supernatant solution is acidified to a pH of about 3.8 with hydrochloric acid and the albumin-like protein which separates removed from the solution by centrifugation. The clear solution is adjusted to pH 7.2 by the addition of dilute sodium hydroxide solution and dialyzed through a cellulosic semi-permeable membrane against cold water until it is substantially free from all inorganic salts and dialyzable organic material. The dialysand is removed from the dialysis bag, placed in a flask and frozen in the customary shell form. The ice is sublimed from the frozen dialysand under reduced pressure (less than about 0.5 mm. of mercury) to obtain the desired antifibrinolysin product as a light, fluffy cream or pinkish colored solid. The material obtained by this unit process assays about 70 to 80% pure antifibrinolysin and is not quite as highly purified as that obtained from the dried partially purified antifibrinolysin product. More potent products such as those obtained in Example 1 can be obtained, however, if the volume of the ammonium sulfate solution prior to acidification is kept at a minimum.

The antifibrinolysin product obtained by Example 2 possesses the same stability characteristics as the product prepared by Example 1.

Similarly, equine or human plasmas or human, bovine or equine blood serums can be used in the above procedures to obtain antifibrinolysin products possessing the same properties as those obtained from bovine plasma as described above.

What we claim as our invention is:

1. In a process for obtaining a highly purified antifibrinolysin product, the steps which comprise acidifying to a pH between about 2.5 to 4 a solution containing an antifibrinolysin product having a purity of about 1 to 2 units of antifibrinolysin per milligram and sufficient ammonium sulfate to at least half saturate the solution, removing the albumin-like protein which separates from the solution, neutralizing the solution, dialyzing the neutralized solution against water through a semi-permeable membrane until it is substantially free from all inorganic salts and dialyzable organic material and then freezing the dialysand and subliming the ice therefrom under greatly reduced pressure.

2. A process for obtaining a highly purified antifibrinolysin product which comprises adding sufficient ammonium sulfate to a blood liquid of the class consisting of plasma and serum at about −5 to +5° C. to bring the ammonium sulfate concentration up to at least 50% of saturation, removing the precipitated material, acidifying the ammonium sulfate solution of the partially purified antifibrinolysin product to a pH between about 2.5 to 4, removing the albumin-like protein which precipitates from the solution, neutralizing the solution, dialyzing the neutralized solution against water through a semi-permeable membrane until it is substantially free from all inorganic salts and dialyzable organic material and then freezing the dialysand and subliming the ice therefrom under greatly reduced pressure.

3. A process for obtaining a highly purified antifibrinolysin product which comprises adding sufficient ammonium sulfate to bovine blood plasma at about −5 to +5° C. to bring the ammonium sulfate concentration up to at least 50% of saturation, removing the precipitated material, acidifying the ammonium sulfate solution of the partially purified antifibrinolysin product to a pH between about 2.5 to 4, removing the albumin-like protein which precipitates from the solution, neutralizing the solution, dialyzing the neutralized solution against water through a semipermeable membrane until it is substantially free from all inorganic salts and dialyzable organic material and then freezing the dialysand and subliming the ice therefrom under greatly reduced pressure.

4. In a process for obtaining a highly purified antifibrinolysin product, the steps which comprise acidifying to a pH about 3.8 a solution containing an antifibrinolysin product having a purity of about 1 to 2 units of antifibrinolysin per milligram and sufficient ammonium sulfate to at least half saturate the solution, removing the albumin-like protein which separates from the solution, neutralizing the solution, dialyzing the neutralized solution against water through a semipermeable membrane until it is substantially free from all inorganic salts and dialyzable organic material and then freezing the dialysand and subliming the ice therefrom under greatly reduced pressure.

5. A process for obtaining a highly purified antifibrinolysin product which comprises adding sufficient ammonium sulfate to a blood liquid of the class consisting of plasma and serum at about −5 to +5° C. to bring the ammonium sulfate concentration up to at least 50% of saturation, removing the precipitated material, acidifying the ammonium sulfate solution of the partially purified antifibrinolysin product to a pH about 3.8, removing the albumin-like protein which precipitates from the solution, neutralizing the solution, dialyzing the neutralized solution against water through a semipermeable membrane until it is substantially free from all inorganic salts and dialyzable organic material and then freezing the dialysand and subliming the ice therefrom under greatly reduced pressure.

6. A process for obtaining a highly purified antifibrinolysin product which comprises adding sufficient ammonium sulfate to bovine blood plasma at about −5 to +5° C. to bring the ammonium sulfate concentration up to at least 50% of saturation, removing the precipitated material, acidifying the ammonium sulfate solution of the partially purified antifibrinolysin product to a pH about 3.8, removing the albumin-like protein which precipitates from the solution, neutralizing the solution, dialyzing the neutralized solution against water through a semi-permeable membrane until it is substantially free from all inorganic salts and dialyzable organic material and then freezing the dialysand and subliming the ice therefrom under greatly reduced pressure.

EUGENE C. LOOMIS.
ALBERT RYDER.
CHARLES GEORGE, Jr.

REFERENCES CITED

The following references are of record in the file of this patent:

Chemical Abstracts: vol. 29, page 8043 (1935), citing Doudoroff: Proc. Soc. Exptl. Biol. and Med., vol. 32, pp. 1467–1468 (1935).

Hewitt: Biochemical Journal, vol. 32 (1938), page 27.

Cohn: Chemical Reviews, vol. 28 (1941), pp. 395–417.